US006094651A

United States Patent
Agrawal et al.

[19]
[11] Patent Number: 6,094,651
[45] Date of Patent: Jul. 25, 2000

[54] DISCOVERY-DRIVEN EXPLORATION OF OLAP DATA CUBES

[75] Inventors: Rakesh Agrawal; Sunita Sarawagi, both of San Jose, Calif.

[73] Assignee: International Business Machines Corporation, Armonk, N.Y.

[21] Appl. No.: 08/916,346

[22] Filed: Aug. 22, 1997

[51] Int. Cl.⁷ .................................................. G06F 17/30
[52] U.S. Cl. .................................... 707/5; 707/2; 707/200
[58] Field of Search .............................. 707/5, 2, 3, 102, 707/1, 20, 200; 706/62; 702/13; 356/237.2; 367/73

[56] References Cited

U.S. PATENT DOCUMENTS

| | | | |
|---|---|---|---|
| 4,719,571 | 1/1988 | Rissanen et al. | 707/101 |
| 4,956,774 | 9/1990 | Shibamiya et al. | 707/2 |
| 5,031,206 | 7/1991 | Riskin | 379/93.27 |
| 5,168,565 | 12/1992 | Morita | 707/3 |
| 5,263,120 | 11/1993 | Bickel | 706/62 |
| 5,321,612 | 6/1994 | Stewart | 702/13 |
| 5,359,724 | 10/1994 | Earle | 707/20 |
| 5,418,951 | 5/1995 | Damashek | 707/5 |
| 5,446,908 | 8/1995 | Kevorkian | 710/240 |
| 5,511,190 | 4/1996 | Sharma et al. | 707/1 |
| 5,598,559 | 1/1997 | Chaudhuri | 707/2 |
| 5,655,137 | 8/1997 | Kevorkian | 712/17 |
| 5,669,006 | 9/1997 | Joskowicz et al. | 707/517 |
| 5,713,020 | 1/1998 | Reiter et al. | 707/102 |
| 5,742,283 | 4/1998 | Kim | 345/302 |
| 5,784,540 | 7/1998 | Faltings | 706/46 |
| 5,799,300 | 8/1998 | Agrawal et al. | 707/5 |
| 5,799,311 | 8/1998 | Agrawal et al. | 707/102 |
| 5,808,966 | 9/1998 | Calvert et al. | 367/73 |
| 5,822,751 | 10/1998 | Gray et al. | 707/3 |
| 5,825,482 | 10/1998 | Nikoonahad et al. | 356/237.2 |
| 5,832,475 | 11/1998 | Agrawal et al. | 707/2 |
| 5,884,320 | 3/1999 | Agrawal et al. | 707/104 |
| 5,890,151 | 3/1999 | Agrawal et al. | 707/5 |
| 5,890,191 | 3/1999 | Agrawal et al. | 707/5 |
| 5,926,820 | 7/1999 | Agrawal et al. | 707/200 |

OTHER PUBLICATIONS

Ho et al., "Range Queries in OLAP Data Cubes", SIGMOD '97 AZ. USA, p.73–88, May 1997.
Ho et al., "Partial–Sum Queries in OLAP Data Cubes Using Covering Codes", PODS'97 Tucson AZ ACM, p. 228–237, 1997.
Harinarayan et al., "Implementing Data Cubes Efficiently", SIGMOD '96 ACM, p. 205–216, 1996.
Hacid et al., "A Rule–Baes Data Manipulation Language for OLAP Systems", Data Warehouse Quality, p. 1–2, 1997.
Hacid et al., "An Object–Centered Multi–dimensional Data Model with Hierarchically Structured Dimensions", IEEE, p. 65–72, Nov. 1997.
Gray et al., "Data Cube: A Relational Aggregation Operator Generalzing Group–By, Cross–Tab, and Sub–Totals", Microsoft Research Advanced Technology Division, p. 1–18, Jul. 1995.
Taylor, Art, "Three Tiers for Web OLAP", Database Programming & Design, vol. 1, No. 7, p. 55–58, Jul. 1998.

*Primary Examiner*—Thomas G. Black
*Assistant Examiner*—Charles L. Rones
*Attorney, Agent, or Firm*—Khanh Q. Tran; Banner & Witcoff, Ltd.

[57] ABSTRACT

A method for locating data anomalies in a k dimensional data cube that includes the steps of associating a surprise value with each cell of a data cube, and indicating a data anomaly when the surprise value associated with a cell exceeds a predetermined exception threshold. According to one aspect of the invention, the surprise value associated with each cell is a composite value that is based on at least one of a Self-Exp value for the cell, an In-Exp value for the cell and a Path-Exp value for the cell. Preferably, the step of associating the surprise value with each cell includes the steps of determining a Self-Exp value for the cell, determining an In-Exp value for the cell, determining a Path-Exp value for the cell, and then generating the surprise value for the cell based on the Self-Exp value, the In-Exp value and the Path-value.

44 Claims, 9 Drawing Sheets

60

| | Stores | Products | | | | | All $\beta_j$ | In–Exp |
|---|---|---|---|---|---|---|---|---|
| | | 1 | 2 | 3 | 4 | 5 | | |
| | 1 | 0.1 | 0 | 0 | 3 | 0.5 | 1.0 | 3 |
| | 2 | 0 | 3 | 0 | 1 | 0.5 | 2.5 | 3 |
| | 3 | 0 | 3 | 0.3 | 0 | 0.6 | 0.4 | 3 |
| | 4 | 0 | 3 | 0 | 0 | 1 | 0.8 | 3 |
| | 5 | 0 | 0 | 0 | 0 | 0.5 | 2.8 | 0.5 |
| All | $\alpha_i$ | 1 | 2 | 1 | .5 | .6 | 10 | – |
| | In–Exp | 0.1 | 3 | 0.3 | 3 | 1 | – | 3 |

61

| Product | (All) |
|---------|-------|
| Region  | (All) |

| Avg. Sales | Month |     |     |     |     |     |     |     |     |     |     |     |
|------------|-------|-----|-----|-----|-----|-----|-----|-----|-----|-----|-----|-----|
|            | Jan   | Feb | Mar | Apr | May | Jun | Jul | Aug | Sep | Oct | Nov | Dec |
| Total      |       | 2%  | 0%  | 2%  | 2%  | 4%  | 3%  | 0%  | -8% | 0%  | -3% | 4%  |

FIG. 1

| Region | (All) | | | | | | | | | | | |
|---|---|---|---|---|---|---|---|---|---|---|---|---|
| Avg. Sales | Month | | | | | | | | | | | |
| Product | Jan | Feb | Mar | Apr | May | Jun | Jul | Aug | Sep | Oct | Nov | Dec |
| Birch-B | | 10% | -7% | 3% | -4% | 15% | 12% | -3% | 1% | 42% | -14% | 10% |
| Chery-S | | 1% | 1% | 4% | 3% | 5% | 5% | -9% | -12% | 1% | -5% | 5% |
| Cola | | -1% | 2% | 3% | 4% | 9% | 4% | 1% | -11% | -8% | -2% | 7% |
| Cream-S | | 3% | 1% | 6% | 3% | 3% | 8% | -3% | -12% | -2% | 1% | 10% |
| Diet-B | | 1% | 1% | -1% | 2% | 1% | 2% | 0% | -6% | -1% | -4% | 2% |
| Diet-C | | 3% | 2% | 5% | 2% | 4% | 7% | -7% | -12% | -2% | -2% | 8% |
| Diet-S | | 2% | -1% | 0% | 0% | 4% | 2% | 4% | -9% | 5% | -3% | 0% |
| Grape-S | | 1% | 1% | 0% | 4% | 5% | 1% | 3% | -9% | -1% | -8% | 4% |
| Jolt-C | | -1% | -4% | 2% | 2% | 0% | -4% | 2% | -9% | -2% | 0% | 0% |
| Kiwi-S | | 2% | 1% | 4% | 1% | -1% | 3% | -1% | 6% | 4% | 0% | 1% |
| Old-B | | 4% | -1% | 0% | 1% | 5% | 2% | 7% | -4% | 3% | -3% | 1% |
| Orang-S | | 1% | 1% | 3% | 4% | 2% | 1% | -1% | -10% | -6% | -4% | 9% |
| Saspria | | -1% | 2% | 1% | 3% | -3% | 5% | -10% | -2% | -1% | 1% | 5% |

FIG. 2

| Product | Diet-S | | | | | | | | | | | |
|---|---|---|---|---|---|---|---|---|---|---|---|---|
| Avg. Sales | Month | | | | | | | | | | | |
| Region | Jan | Feb | Mar | Apr | May | Jun | Jul | Aug | Sep | Oct | Nov | Dec |
| C | 0% | -2% | 0% | 1% | 4% | 1% | 5% | -6% | 2% | -2% | -2% |
| E | 0% | 2% | -8% | 7% | 0% | 5% | -40% | 10% | 33% | 2% | 8% |
| S | 0% | -1% | 3% | -2% | 2% | -2% | 19% | -1% | 12% | -1% | 0% |
| W | 5% | 1% | 0% | -2% | 6% | 6% | 2% | -17% | 9% | -7% | 2% |

FIG. 3

| Market | (All) |
|---|---|
| Product | Cola |

| Avg. Sales | Month | | | | | | | | | | | |
|---|---|---|---|---|---|---|---|---|---|---|---|---|
| Region | Jan | Feb | Mar | Apr | May | Jun | Jul | Aug | Sep | Oct | Nov | Dec |
| C | 5 | 3% | 1% | 4% | 1% | 4% | 10% | -11% | -14% | -3% | 5% | 11% |
| E | | -3% | 3% | 4% | 4% | 13% | 2% | 0% | -10% | -13% | -3% | 8% |
| S | | 2% | -1% | 1% | 9% | 6% | 3% | 21% | -15% | 1% | -5% | 4% |
| W | | -2% | 2% | 2% | 4% | 12% | 1% | 1% | -9% | -11% | -4% | 6% |

| | Stores | Products | | | | | $\beta_j$ | All In-Exp |
|---|---|---|---|---|---|---|---|---|
| | | 1 | 2 | 3 | 4 | 5 | | |
| | 1 | 0.1 | 0 | 0 | 3 | 0.5 | 1.0 | 3 |
| | 2 | 0 | 3 | 0 | 1 | 0.5 | 2.5 | 3 |
| | 3 | 0 | 3 | 0.3 | 0 | 0.6 | 0.4 | 3 |
| | 4 | 0 | 3 | 0 | 0 | 1 | 0.8 | 3 |
| | 5 | 0 | 0 | 0 | 0 | 0.5 | 2.8 | 0.5 |
| All | $\alpha_i$ | 1 | 2 | 1 | .5 | .6 | 10 | — |
| | In-Exp | 0.1 | 3 | 0.3 | 3 | 1 | — | 3 |

DISCOVERY-DRIVEN EXPLORATION OF OLAP DATA CUBES

CROSS-REFERENCE TO RELATED APPLICATIONS

The present application is related to an application entitled "Automatic Subspace Clustering Of High-dimensional Data For Data Mining Applications," by Dimitrios Gunopulos, Johannes Gehrke, Prabhakar Raghavan and Rakesh Agrawal, Ser. No. 08/916,347 now pending, having common ownership, filed concurrently with the present application, and incorporated by reference herein.

BACKGROUND OF THE INVENTION

1. Field of the Invention

The present invention relates to the field of computing. More particularly, the present invention relates to a method for interactively exploring a data cube for anomalous data.

2. Description of the Related Art

On-Line Analytical Processing (OLAP) is a computing technique for summarizing, consolidating, viewing, applying formulae to, and synthesizing data according to multiple dimensions. OLAP software enables users, such as analysts, managers and executives, to gain insight into performance of an enterprise through rapid access to a wide variety of data views that are organized to reflect the multidimensional nature of the enterprise performance data. An increasingly popular data model for OLAP applications is the multidimensional database (MDDB), which is also known as the data cube. OLAP data cubes are predominantly used for interactive exploration of performance data for finding regions of anomalies in the data, which are also referred to as exceptions or deviations. Problem areas and/or new opportunities are often identified when an anomaly is located.

To create an MDDB from a collection of data, a number of attributes associated with the data are selected. Some of the attributes are chosen to be metrics of interest and are each referred to as a "measure," while the remaining attributes are referred to as "dimensions." Dimensions usually have associated "hierarchies" that are arranged in aggregation levels providing different levels of granularity for viewing the data.

Exploration typically begins at the highest level of a dimensional hierarchy. The lower levels of hierarchies are then "drilled-down" to by looking at the aggregated values and visually identifying interesting values within the aggregated values. For example, drilling-down along a product dimension from a product category to a product type may identify product types exhibiting an anomalous sales behavior. Continued drill-down from the product type may identify individual products causing the anomalous sales behavior. If exploration along a particular path does not yield interesting results, the path is "rolled-up" and another branch is examined. A roll-up may return to an intermediate level for drilling-down along another branch, or the top-level of the hierarchy may be returned to and another drill-down may continue along another dimension.

Besides being cumbersome, this "hypothesis-driven" exploration for anomalies has several shortcomings. For example, the search space is usually large—a typical data cube has 5–8 dimensions with any particular dimension having hundreds of values, and each dimension having a hierarchy that is 3–8 levels high, as disclosed by George Colliat, OLAP, relational, and multidimensional database systems, Technical report, Arbor Software Corporation, Sunnyvale, Calif., 1995. Consequently, an anomaly can be hidden in any of several million values of detailed data that has been aggregated at various levels of detail. Additionally, higher level aggregations from where an analysis typically begins may not be affected by an anomaly occurring below the starting level because of cancellation effects caused by multiple exceptions or simply by the large amount of aggregated data. Even when data is viewed at the same level of detail as where an anomaly occurs, the exception might be hard to notice.

What is needed is a way for conveniently performing an exploration of a data cube that ensures that abnormal data patterns are not missed at any level of data aggregation, regardless of the number of dimensions and/or hierarchies of the data.

SUMMARY OF THE INVENTION

The present invention provides a "discovery-driven" approach for data exploration of a data cube where a search for anomalies is guided to interesting areas of the data by pre-mined paths that are based on exceptions found at various levels of data aggregation. Consequently, the present invention ensures that abnormal data patterns are not missed at any level of data aggregation, regardless of the number of dimensions and/or hierarchies of the data by providing a paradigm of pre-excavated exceptions.

Further, the present invention provides an approach for effectively navigating large multidimensional OLAP datasets for locating exceptions, and for guiding a user to interesting regions in a data cube using pre-mined exceptions that exhibit anomalous behavior. The number of drill-downs and selection steps are significantly reduced by the present invention in comparison to conventional approaches for manually finding exceptions, especially in large data cubes having many different dimensions and hierarchies.

The advantages of the present invention are provided by a method for locating data anomalies in a k dimensional data cube that includes the steps of associating a surprise value with each cell of a data cube, and indicating a data anomaly when the surprise value associated with a cell exceeds a predetermined exception threshold. According to one aspect of the invention, the surprise value associated with each cell is a composite value that is based on at least one of a Self-Exp value for the cell, an In-Exp value for the cell and a Path-Exp value for the cell. Preferably, though, the step of associating the surprise value with each cell includes the steps of determining a Self-Exp value for the cell, determining an In-Exp value for the cell, determining a Path-Exp value for the cell, and then generating the surprise value for the cell based on the Self-Exp value, the In-Exp value and the Path-value.

According to the invention, the Self-Exp value for the cell represents a degree of anomaly of the cell with respect to other cells at a same level of aggregation in the data cube, while the In-Exp value for the cell represents a degree of anomaly underneath the cell in the data cube, and the Path-Exp value for the cell represents a degree of surprise for each respective drill-down path in the data cube from the cell. The In-Exp value for the cell can be a maximum surprise value associated with all cells in the data cube underneath the cell, or alternatively, be a sum of surprise values associated with all cells in the data cube underneath the cell. The Path-Exp value for the cell is based on a drill-down path having a fewest number of high value In-Exp cells in the data cube underneath the cell.

The surprise value of the cell is a residual difference between an expected value for the cell and an actual value for the cell. The expected value for the cell is obtained by summing, or alternatively, multiplying, coefficients corresponding to each of 2k−1 levels of aggregation of the data cube. A coefficient for each group-by is determined by recursively subtracting all coefficients from group-bys that are at a smaller level of detail than a level of detail of the group-by from an average value, or alternatively, a median value at the group-by.

The present invention also provides a method for determining aggregate values for each group-by of the data cube based on a selected aggregation function, determining residuals for the cell at each group-by of the data cube, and summarizing exceptional values of the data cube based on the determined residuals. Accordingly, the step of determining residuals at each group-by includes the steps of determining an average value for each cell at each level of aggregation, and recursively subtracting from each average value residuals that are at a lower level of detail than the cell.

Another aspect of the present invention provides a program storage device that has a storage area with information stored in the storage area. The information is readable by a machine, and tangibly embodies a program of instructions executable by the machine for performing the method of the present invention described herein for interactively exploring OLAP data cubes. The program storage device can be a magnetically recordable medium device, such as a magnetic diskette or hard drive, or an optically recordable medium device, such as an optical disk.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
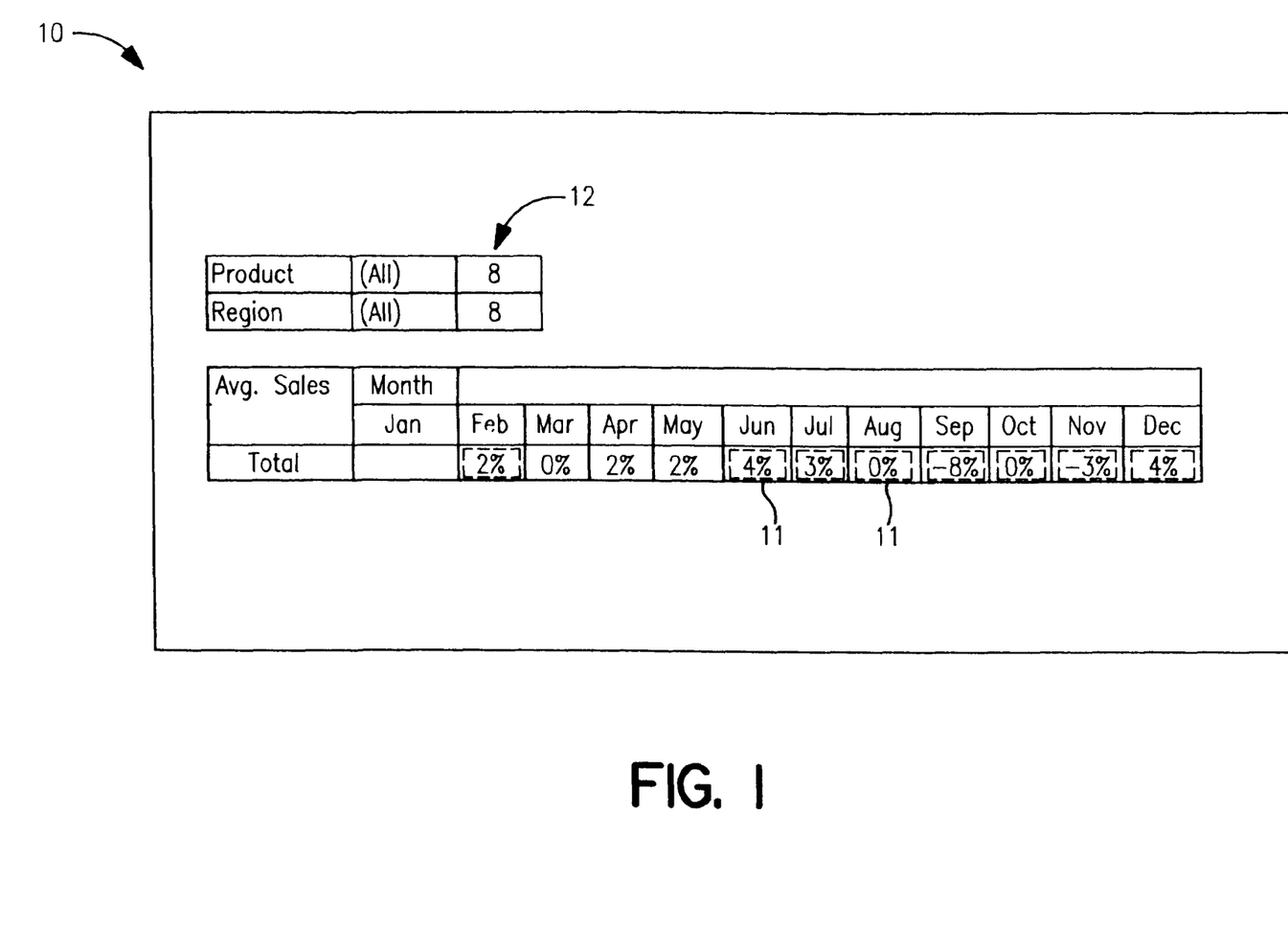
FIG. 1 shows an exemplary display of a view of aggregated data of a data cube for an On-Line Analytical Processing (OLAP) session according to the present invention.

FIG. 1 shows an exemplary display 10 of a view of aggregated data of a data cube for an On-Line Analytical Processing (OLAP) session according to the present invention. Display 10 shows a tabular display of change in average sales of a product line over time. The user interface for the session of FIG. 1 is based on a Microsoft Excel spreadsheet, extended with appropriate macros, as the front-end for user-interaction. The session of FIG. 1 is performed on a three-dimensional data cube having the dimensions of Product, Market and Time. The Market dimension has a hierarchy defined as: Market→Region→ALL. Data for the cube is based on a sample OLAP database in Arbor Software Corporation's Essbase 4.0, as disclosed by Arbor Software Corporation, Application Manager User's Guide, Essbase version 4.0, http://www.arborsoft.com.

According to the invention, each cell of the cube is annotated at all levels of detail with a numeric "surprise" value that is associated with the cell. The surprise value represents the degree of surprise, or anomaly, of the cell contents with respect to other cells, and is a composite value of a Self-Exp value, an In-Exp value, and a Path-Exp value. Briefly, the Self-Exp value represents the surprise value of the cell with respect to other cells at the same level of aggregation. The In-Exp value represents the degree of surprise underneath the cell when a drill-down from the cell is performed. The Path-Exp value represents the degree of surprise for each respective drill-down path from the cell. A more complete definition of each surprise value is given below.

To illustrate the present invention, suppose that a data cube of monthly sales as a percentage difference from the previous month is analyzed for anomalies or exceptions. The analysis begins with a view of data that has been aggregated over all products and markets for different months of the year, such as view 10 shown in FIG. 1.

To determine the areas of the cube that are worth exploring in terms of exceptions, a "highlight exceptions" feature of the present invention is invoked that causes the background (21 in FIG. 2) of each cell to be highlighted with a particular color, for example, based on the Self-Exp value for the cell. Additionally, the border 11 of each cell is colored based on the In-Exp value for the cell. For both the Self-Exp and the In-Exp exception cases, the intensity of the highlighting color signifies the relative degree of exception. While the relative intensity of the highlighting is described in terms of colors, FIGS. 1–5 show the relative intensities in terms of a grey scale. The "highlight exception" feature, as other features and functions of the present invention are invoked in a well-known manner, such as by clicking on a graphical user interface (GUI) button or by a command entered using a keyboard.

As represented in FIG. 1, the cells with a border having a high In-Exp value, that is, having a relatively greater intensity border coloring, require drilling-down for finding exceptions located underneath them. Cells having borders of greater intensity, for example, the cells for the months of August, September, and October, have relatively higher values of In-Exp than cells having borders of lesser intensity, such as the cells for the months of February and June.

For this example, there are two paths that can be drilled-down from this level, a path along the Product dimension and a path along the Market dimension. To determine which of these paths will be more interesting to evaluate in terms of exceptions, a "show exception" feature of the present invention is invoked that returns a number indicating the surprise value for each path. The Path-Exp values are shown at 12 for the cells shown in FIG. 1. In this example, both paths have the same degree of surprise.

Figure 2:
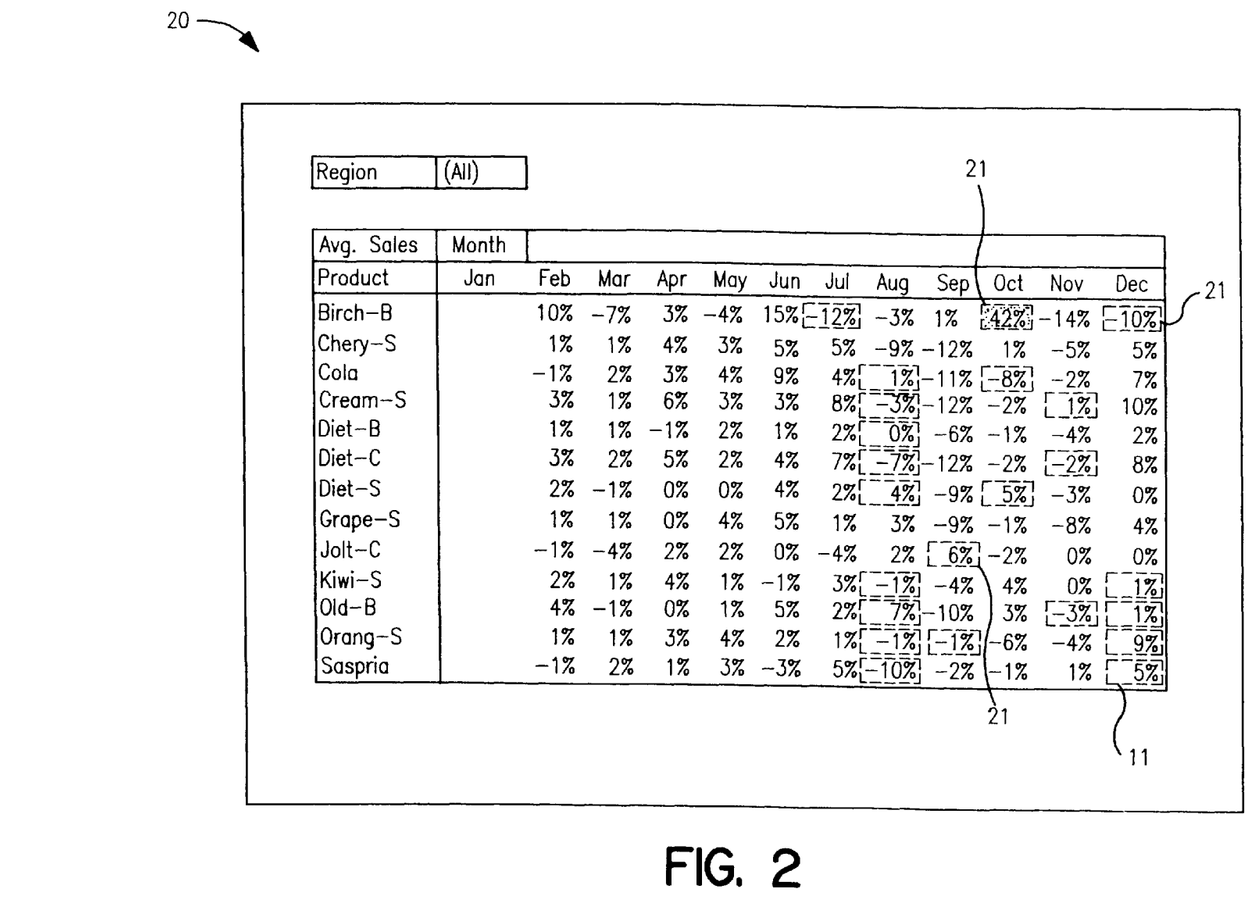
FIG. 2 shows an exemplary display of another view of aggregated data for changes in sales over time for a group of products for the OLAP session of FIG. 1 according to the present invention.

Suppose a drill-down path along the Product dimension is chosen. FIG. 2 shows an exemplary display 20 of another view of aggregated data for changes in sales over time for a group of products resulting from the drill-down along the Product dimension for the OLAP session of FIG. 1. Display 20 shows a total of 143 sales figures corresponding to different Product-Time combinations. Instead of attempting to find exceptions by visual inspection, the "highlight exception" of the present invention can be invoked for quickly identifying exceptional values. For this example, there are several cells having a high Self-Exp value that are displayed with a background color 21 that is different from cells having a Self-Exp value that is below a setable exception threshold value. Again, the relative intensity of the highlighting color indicates the relatively magnitude of a Self-Exp surprise value. For instance, sales of "Birch-B(eer)" show an exceptional increase of 42% for the month of October. Additionally, three other cells are indicated as having large Self-Exp values, although the respective sales values (6% for <Jolt-C, Sep>, -12% for <Birch-B, Dec>) are not exceptionally large in comparison with all other cells. Details regarding the reasons that these particular cells are highlighted is provided below.

FIG. 2 also shows cells having relatively large In-Exp values, as indicated by highlighted borders 11. The highest In-Exp values are indicated for the product "Diet-S(oda)" for the months of August and October. Exploration of the anomalies underlying these cells for "Diet-Soda" is performed by drilling-down from these cells along the Region dimension.

Figure 3:
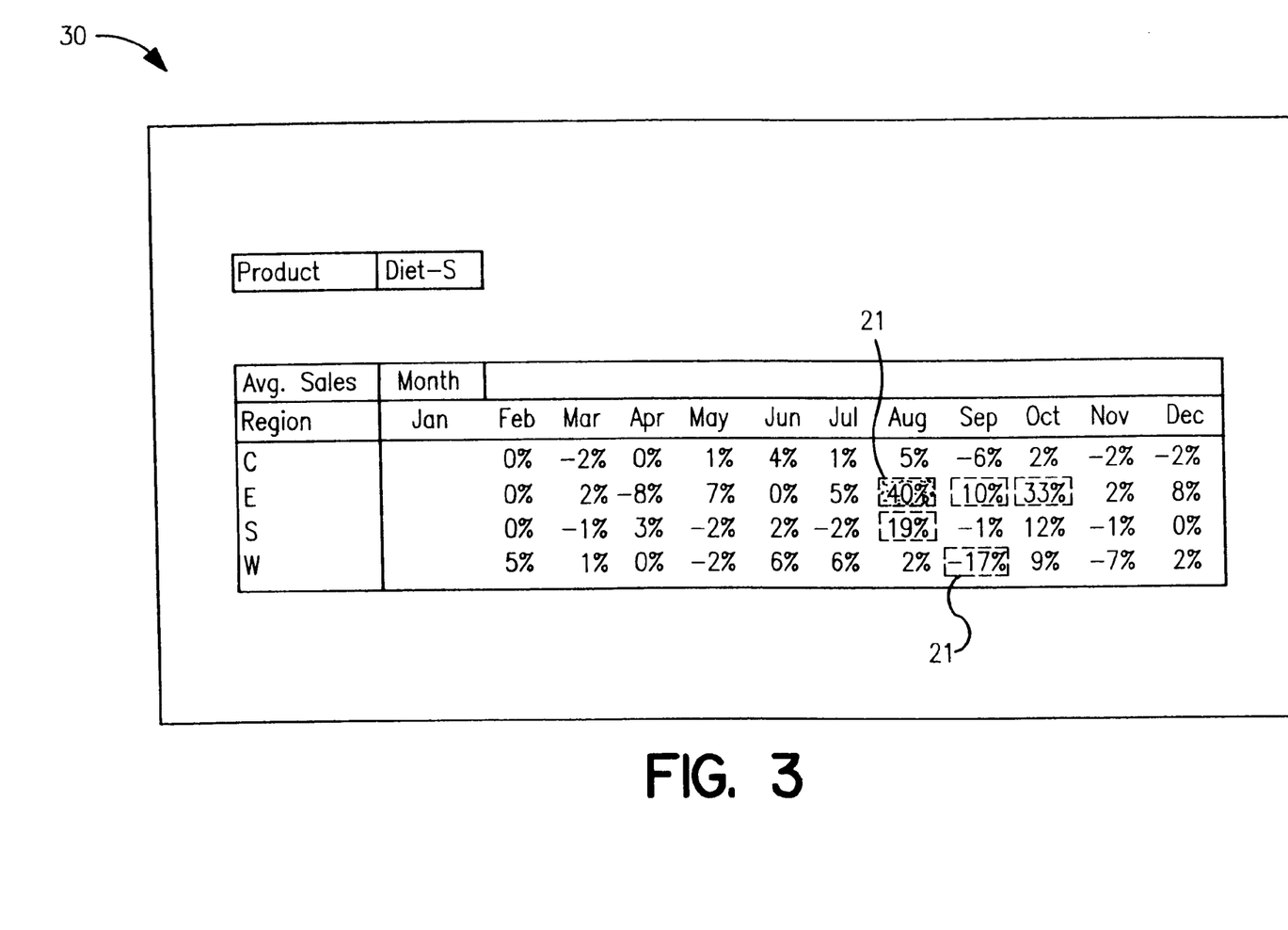
FIG. 3 shows an exemplary display of yet another view of aggregated data for changes in sales over time for different regions for an exemplary product for the OLAP session of FIG. 1 according to the present invention.

FIG. 3 shows an exemplary display 30 of yet another view of aggregated data for changes in sales over time for different regions for the product "Diet-Soda" resulting from a drill-down along the Region dimension for the OLAP session of FIG. 1. The highlighted exceptions in the Product-Time plane show that sales of "Diet-Soda" in Region "E" (Eastern) decreased by an exceptionally high value of 40% and 33% for the months of August and October, respectively. The sale of "Diet-Soda" in the Product-Time plane aggregated over different regions (FIG. 2) provides little indication of these relatively high exceptions in the Region-Product-Time space. Thus, an In-Exp value displayed at a higher-level cell is valuable for searching for exceptions occurring in lower-level cells.

Figure 4:
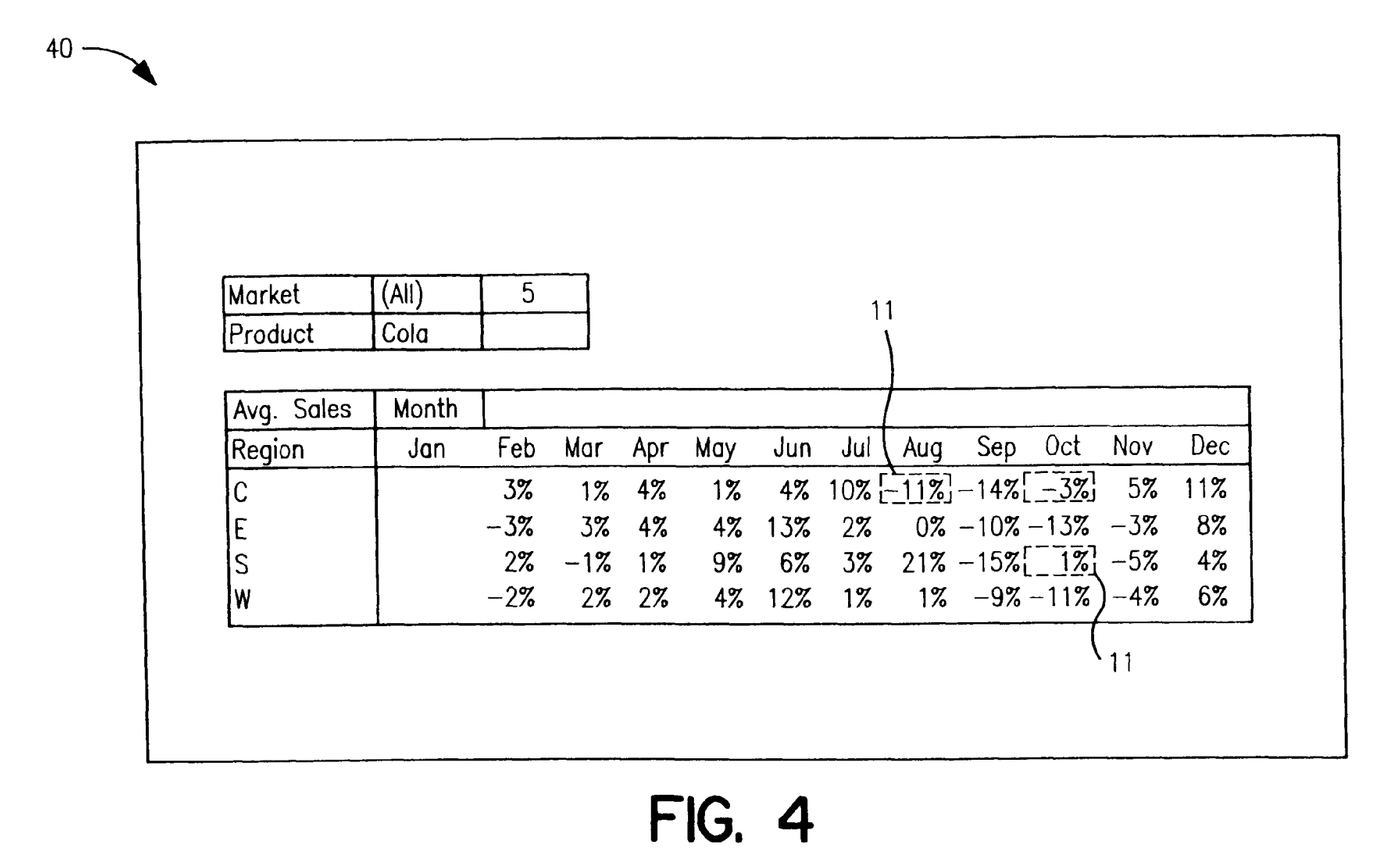
FIG. 4 shows an exemplary display of still another view of aggregated data for changes in sales over time for different regions for another exemplary product for the OLAP session of FIG. 1 according to the present invention.
Figure 5:
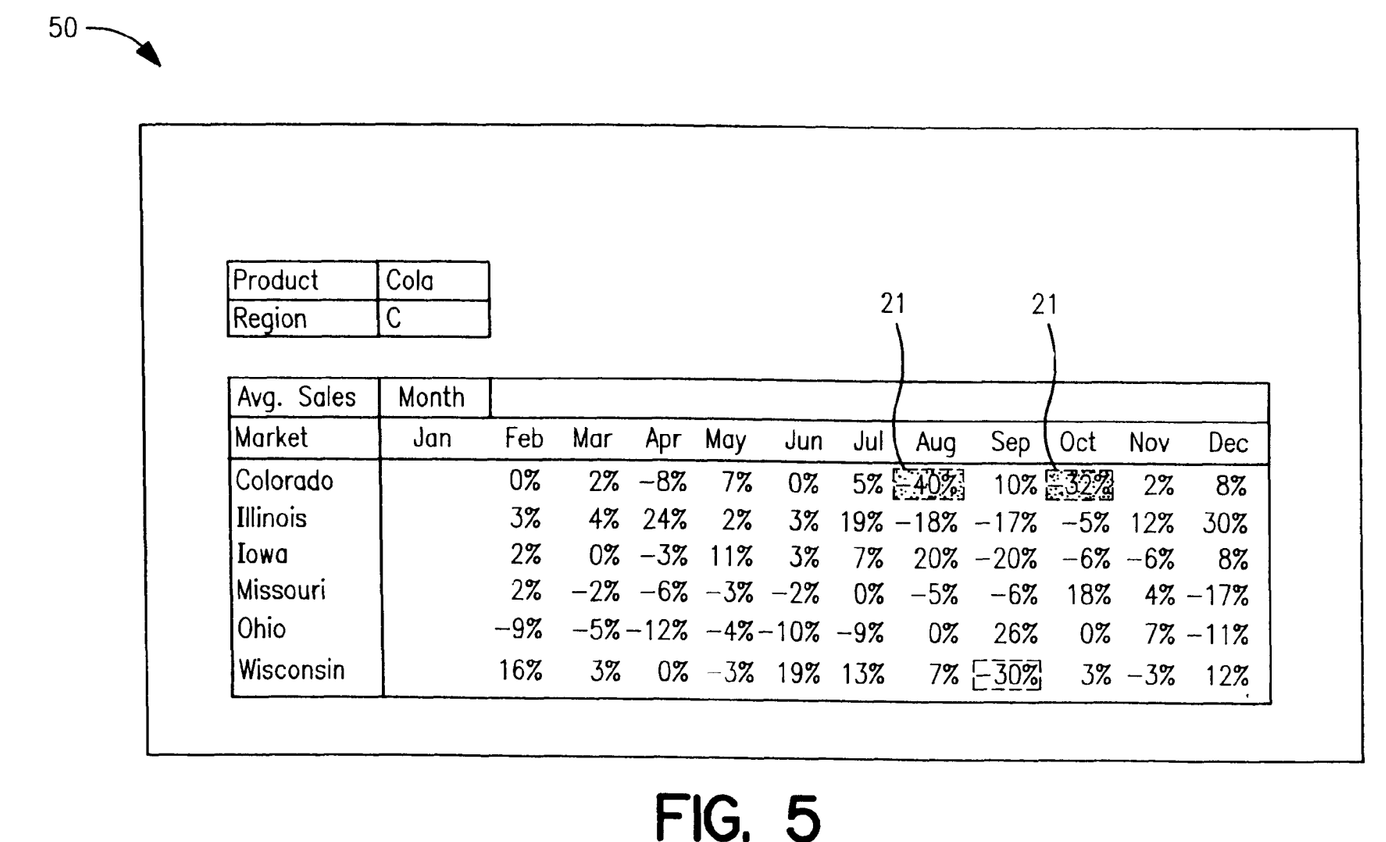
FIG. 5 shows an exemplary display of another view of aggregated data for changes in sales over time for different states in an exemplary region for an exemplary product resulting from a drill-down along the Region dimension for the OLAP session of FIG. 1 according to the present invention.

There are no additional cells having a high In-Exp shown in FIG. 3. Consequently, drilling-down can stop and the Product-Time plane of FIG. 2 can be returned to so that other cells having an In-Exp value of interest can be explored. Suppose a drill-down is performed along the product "Cola" for August. FIG. 4 shows an exemplary display 40 of still view of aggregated data for changes in sales over time for different regions for the product "Cola" resulting from a drill-down along the Region dimension for the OLAP session of FIG. 1. In FIG. 4, Region "C" (Central) has a relatively large In-Exp value, and can be drilled down further. FIG. 5 shows an exemplary display 50 of another view of aggregated data for changes in sales over time for different states in the Central region for the product "Cola" resulting from a drill-down along the Region dimension for the OLAP session of FIG. 1. Self-Exp values in the Market-time plane for "Cola" are shown in FIG. 5.

The present invention uses a general table analysis approach that is based on statistical analysis of experiments for finding exceptions, as disclosed by D. G. Montgomery, Design and Analysis of Experiments, Chapter 13, John Wiley & Sons, Third edition, 1991, and by D. C. Hoaglin et al., Understanding Robust and Exploratory Data Analysis, John Wiley, New York, 1983, both of which are incorporated by reference herein. However, the present invention has been adapted for providing convenient exploration of a data cube for ensuring that abnormal data patterns are not missed at any level of data aggregation, regardless of the number of dimensions and/or hierarchies of the data.

To illustrate the shortcomings of basic conventional table analysis, consider an example of a data cube having dimensions of Product, Store and Time. For this example, the quantity stored in each cell is the percentage decrease in total sales over the previous time period. Table 1 represents a snap-shot of the Product-Store plane for a particular time slice.

TABLE 1

| Stores | Products | | | | | | |
|---|---|---|---|---|---|---|---|
| | 1 | 2 | 3 | 4 | 5 | 6 | 7 |
| 1 | 80 | 12 | 8 | 8 | 10 | 11 | 14 |
| 2 | 15 | 3 | 2 | 1 | 2 | 2 | 14 |
| 3 | 90 | 14 | 11 | 10 | 10 | 10 | 12 |
| 4 | 99 | 11 | 10 | 9 | 7 | 12 | 14 |

There are several well-known methods of varying complexity for identifying extreme values in a flat set of numbers. For example, a straightforward approach is to mark as exceptions all values that are greater than a predetermined standard deviation away from an average value. This approach, though, does not work well when the distribution of numbers is multi-modal. In such cases, it is better to cluster numbers and mark as exceptions all values that do not belong to any large cluster. Other methods for identifying exceptions in a flat set of numbers are presented by A. Arning et al., A linear method for deviation detection in large databases, In Proc. Of the 2nd Int'l Conference on Knowledge Discovery in Databases and Data Mining, Portland, Oreg., August 1996, and incorporated by reference herein. The simplest approach is to mark as exceptions values that are extreme in comparison to the entire set of data cube values. Thus, in accordance with the simplest approach, the values 80, 90 and 99 in column 1 of Table 1 would be marked as exceptions because they appear to be exceptionally high values when compared to all the other values.

The problem with the simplest approach is that the position of a value within the table is not taken into account when a value is identified or marked as an exception. For example, considering the percentage increase in sales of Product 1 over all stores (Table 1, column 1), the quantity 15 corresponding to Store 2 appears to be more of an exception than the extreme values 80, 90 and 99 for the simplified approach. For this second approach, <Product 1, Store 2> would be marked or flagged as an exception. Consequently, a better approach for flagging a value as an exception is when the value is an extreme value within a smaller grouping of numbers, such as a grouping corresponding to either rows or columns. In general, a value can be flagged as an exception by modifying the approach by considering a value in all possible groupings of the value and using a well-known extreme-value finding algorithm for each respective group. This modified approach is used by the Explora project, disclosed by W. Klosgen, Efficient discovery of interesting statements in databases, Journal of Intelligent Information Systems: Integrating Artificial Intelligence and Database Technologies, 4(1):53–69, 1995, and incorporated by reference herein, where a value is marked as interesting or exceptional when it is significantly different than the average value of a larger population values to which it belongs.

The problem with the modified approach is that when the row and column in Table 1 in which the value 15 occurs are simultaneously considered, Store 2, in general, has a smaller increase in sales for almost all products in comparison with other stores. Therefore, a value of 15 for <Product 7, Store 2> is perhaps not an exception. It is more useful in this situation to call the whole of Product 1 as an exception because it is significantly different from all the other products in Table 1. Similarly, Store 2 is an exception when compared with other stores in Table 1. The only real exception in the product-store space is the value of 14 corresponding to <Product 7, Store 2> because the increase in sales for any product for Store 2 is expected to be much smaller when compared with other stores.

The present invention places two qualitative requirements on the definition of an exception for overcoming drawbacks of conventional table analysis approaches. That is, the present invention takes into account trends along different rows, columns, levels and faces that a particular cell belongs to in addition to exceptions associated with the cell at all levels of detail.

An exception is defined, according to the present invention, by first considering a two-dimensional data cube having p values along a first dimension A and q values along a second dimension B. The element or quantity corresponding to the ith value of dimension A and jth value of dimension B is denoted as $y_{ij}$. To estimate the degree of surprise $y_{ij}$ holds in this data cube, an expected value $\hat{Y}_{ij}$ of y is calculated as a function f of three terms: (1) a term $\mu$ that denotes a trend that is common to all y values of the cube, (2) a term $\alpha_i$ that denotes special trends along the ith row with respect to the rest of the cube, and (3) a term $\beta_j$ that denotes special trends along the jth column with respect to the rest of the cube. The residual difference $r_{ij}$ between the expected value $\hat{y}_{ij}=f(\mu,\alpha_i,\beta_j)$ and the actual value $y_{ij}$ represents the degree of surprise of element $y_{ij}$ based on its position in the cube.

When the data cube has three dimensions, for example, with dimension C being the third dimension, the expected value $\hat{y}_{ijk}$ is calculated by taking into account not only the kth value of the third dimension, but also the three values corresponding to the pairs (i,j) in the AB plane, (i,k) in the AC plane and (j,k) in the BC plane. The expected value $\hat{y}_{ijk}$ is then expressed as a function of seven terms as:

$$\hat{y}_{ijk}=f(\mu,\alpha_i,\beta_j,\gamma_k,(\alpha\beta)_{ij},(\alpha\gamma)_{ik},(\gamma\beta)_{kj}), \quad (1)$$

where $(\alpha\beta)_{ij}$ denotes the contribution of the ijth value in AB plane, $(\alpha\gamma)_{ik}$ denotes contribution of jkth value in the AC plane, and $(\gamma\beta)_{kj}$ denotes the contribution of the kjth value in the BC plane. In general, for any k dimensional cube, the y value can be expressed as the sum of the coefficients corresponding to each of the 2k−1 levels of aggregations or group-bys of the cube. To illustrate the present invention, a 3-dimensional cube will be considered.

The function f( ) can take several forms or models. Two particularly useful forms are an additive form, where function f( ) is a simple addition of all its arguments, and a multiplicative form, where function f( ) is a product of all its arguments. The multiplicative form can be transformed to the additive form by performing a logarithm on the original data values. Thus, the final form of Eq. (1) is, $$y_{ijk}=\hat{y}_{ijk}+r_{ijk}=\mu+\alpha_i+\beta_j+\gamma_k+(\alpha\beta)_{ij}+(\alpha\gamma)_{ik}+(\gamma\beta)_{kj})+r_{ijk}, \quad (2)$$

where $r_{ijk}$ is the residual difference between the expected value $\hat{y}_{ij}=f(\mu,\alpha_i,\beta_j)$ and the actual value $y_{ij}$. The relative importance of an exception is based on the relative value of its residual, that is, the higher the value of the residual, the higher the importance of the exception.

For a multiplicative model, the $y_{ijk}$ values denote the log of the original y-values of the cube. The choice of the best form of the function depends on the particular class of data, and is preferably selected by a user having the understanding and experience with the data at hand. Table 2 shows residuals in parentheses for the different products and different stores for the data of Table 1.

TABLE 2

| Stores | Products | | | | | | |
|---|---|---|---|---|---|---|---|
| | 1 (1.8) | 2 (0.1) | 3 (0.4) | 4 (0.5) | 5 (0.4) | 6 (0.4) | 7 (0.1) |
| 1 (0.3) | 0.0 | 0.0 | 0.1 | 0.1 | 0.1 | 0.2 | 0.2 |
| 2 (1.0) | 0.2 | 0.0 | 0.1 | 0.6 | 0.1 | 0.1 | 1.2 |
| 3 (0.30) | 0.1 | 0.0 | 0.1 | 0.2 | 0.0 | 0.0 | 0.5 |
| 4 (0.4) | 0.1 | 0.0 | 0.1 | 0.2 | 0.0 | 0.0 | 0.5 |

There are several ways for deriving values of the coefficients of Eq. (2). One approach is by a mean-based method where the coefficients are estimated as follows:

$$\mu=y_{...}=\text{overall mean or average} \quad (3)$$

$$\alpha_i=y_{i..}-\mu, \quad (4)$$

where $y_{i..}$ is the mean over all numbers with the ith value of A. Thus, for a two-way table, $\alpha_i$ denotes the magnitude of the difference of the average of the numbers along the ith row from the overall average $\mu$.

$$\beta_j=y_{.j.}-\mu, \quad (5)$$

where $y_{.j.}$ is the mean over all numbers with the jth value of B.

$$\gamma_k=y_{..k}-\mu, \quad (6)$$

where $y_{..k}$ is the mean over all numbers with the kth value of C. Lastly, $$(\alpha\beta)_{ij}=y_{ij}-\alpha_i-\beta_j-\mu. \quad (7)$$

The remaining terms are defined analogously.

In general, the coefficient corresponding to any group-by G is recursively calculated by subtracting all coefficients from group-bys that are at a smaller level of detail than group G from the average y value at group-by G.

The mean-based approach for calculating the coefficients of the present invention is not particularly robust in the presence of extremely large outliers. Consequently, a number of well-known alternative approaches for handling large outliers can be used, such as the median polish method and the square combining method, disclosed by D. Hoaglin et al., Exploring data tables, trends and shapes, Wiley series in probability, 1988, and incorporated by reference herein. These two alternative approaches are based on using a "median" instead of "mean" for calculating the coefficients. Nevertheless, these alternative approaches have an associated high computational cost. Consequently, the mean-based approach is preferred for most OLAP data sets because significantly large outliers are uncommon in most data sets.

FIG. 2 shows the absolute value of the residuals and coefficients after applying the multiplicative model of Eq. (2) to the data in Table 1. In the Product-Store plane, the entry corresponding to <Product 7, Store 2> has the highest residual value. That is, Store 2 has the highest residual in the store plane, and Product 1 has the highest residual in the product plane. Thus, the present invention identifies the correct exceptions at the appropriate level of detail by examining the residual values at different levels.

Similarly, consider the earlier example of a data cube shown in FIGS. 1 and 2. The entry <Birch-B, Dec>, having a y value of −10%, is indicated as an exception, whereas the entry <Old-B, Sep>, having the same y value, is not because in the December column nearly all products other than Birch-Beer have a large positive value, whereas in the September column, most products have a negative value. The product "Jolt-C" is the only product in the September column having a positive y-value and is, according to the approach of the present invention, indicated as an exception.

The method for determining residual and coefficients of the present invention can be extended to handle hierarchies along one or more dimensions of a data cube. The basic idea is to define the expected value of a data cube element, not only based on its row and column position, but also on its hierarchical parents. For instance, consider values $y_{ij}$ in a data cube consisting of two dimensions A and B, where dimension A has two levels of hierarchies: $A^1 \to A^2 \to ALL$. To calculate an expected value $\hat{y}_{ij}$ at the $A^1B$ level, the row coefficient $\alpha_i$ at level $A^1$, the column coefficient $\beta_j$ at level B and overall coefficient $\mu$ at level ALL, two new terms corresponding to the two new aggregations $A^2$ and $A^2B$ along the hierarchy on A are used. Equation (2) thus becomes:

$$\hat{y}_{ij} = \mu + \alpha_i + \beta_j + \alpha'_{i'} + (\alpha'\beta)_{i'j}, \quad (8)$$

where i' denotes the parent of i at hierarchy level $A^2$, $\alpha'_{i'}$ denotes the contribution of the ith value at level $A^2$, and $(\alpha'\beta)_{i'j}$ denotes the contribution due to the ijth value at level $A^2B$.

The general formula for handling hierarchies is to express a y value in a cube in terms of coefficients obtained from all higher level aggregations of the cube. For example, for the y-values at $A^1B$ in Eq. (8), coefficients from the five higher level aggregates are used, that is, $A^1$, $A^2$, B, $A^2B$, and ALL. The same recursive rule of the previous subsection is followed for estimating the coefficients, where $\mu$ is first estimated as the overall average, and then for terms corresponding to each group-by G. The average at group-by G is computed and then the coefficients from each child of G are subtracted from the computed average.

Data in an OLAP cube often includes a time dimension. Time is special in not only that it is a quantitative attribute (unlike product and store that are categorical), but may include seasonality effects and trends that are specific to time. Although the table analysis method of the present invention has been described thus far as treating time as a categorical attribute, the present invention can automatically filter any seasonal pattern that is common to all elements of a data cube. For example, suppose the total sales of all stores is much higher in December than for any other month of each of five previous years. When looking at the sales for a single store S with respect to time, the sales in December might appear exceptionally high compared to other months. However, when comparing the December sales for all stores, the high December sales figure for store S in does not appear exceptional. Thus, the coefficient for store S corresponding only to the month of December each year has a high value. By defining a hierarchy that is based on months of the year, a seasonal-type exception can be filtered so that instead of December of each year being indicated as an exception, one exception is obtained in the month of December over all years. When different products exhibit different seasonality patterns, each Product-Store pair is considered separately, and the seasonality and other trends are filtered out by comparing the values as a function of time. The table analysis method of the present invention is then applied on the transformed cube for locating exceptions.

Exceptions occurring in lower levels of a data cube as are summarized by the present invention as individual numbers at higher levels of the cube. In particular, for all cells displayed, exceptions in their respective group-bys are made apparent and particular cells that require further drilling-down for exceptions occurring underneath are indicated. For each cell that is an exception, the present invention provides a clear indication which particular path is the best path for getting to exceptions. These features are provided by definitions of the quantities Self-Exp, In-Exp and Path-Exp, which are now formally defined.

Self-Exp denotes the exception value of a cell, and is defined to be the scaled absolute value of the residual of the cell obtained from Eq. (2). The residuals at each group-by of the cube are scaled by the root mean squared residual over all elements of the group-by so that the residual is invariant to changes in scale of the y-values.

In-Exp denotes the degree of surprise underneath a cell, and represents the total surprise value over all elements reachable by drill-downs from the cell, not just the immediate detail-level elements. Preferably, In-Exp is defined as a "Max" function of all of the cells underneath a cell, that is, the maximum surprise value of all of the cells underneath a cell. Alternative definitions for In-Exp can be based on the total count of surprises of all cells underneath the cell, the sum of the surprise values of all cells underneath the cell, the sum of the Self-Exp of all cells underneath the cell, a polynomial combination of surprise values of all cells underneath the cell, the product of the surprise values of all cells underneath the cell, the product of the Self-Exp of all cells underneath the cell, the variance of surprise values of all cells underneath the cell, an average (sum or product) of all surprise values underneath the cell, and a median (sum or product) of all surprise values underneath the cell. One caveat when using a sum-based definition is that a dimension having several small residuals may have a larger sum when compared to a small dimension with a few large entries.

Path-Exp denotes the ranking of the degree of surprise expected if a drill down is performed along a particular path for each drill-down path from a cell. Preferably, Path-Exp is defined as the "Max" of the Self-Exp and In-Exp over all cells reachable by drilling-down along a particular path. An important characteristic of the definition of Path-Exp includes the additional goal of providing a path that requires as few cells as possible to be drilled-down. Therefore, when comparing two paths A and B on the basis of Path-Exp, the Path-Exp of path A is ranked higher than the Path-Exp of path B whenever the number of high In-Exp value cells in path A is fewer than the number of high value In-Exp cells in path B, provided that the max(Self-Exp over all A values) equals the max(Self-Exp over all B values) and the max(In-Exp over all A values) equals the max(In-Exp over all B values).

Figure 6:
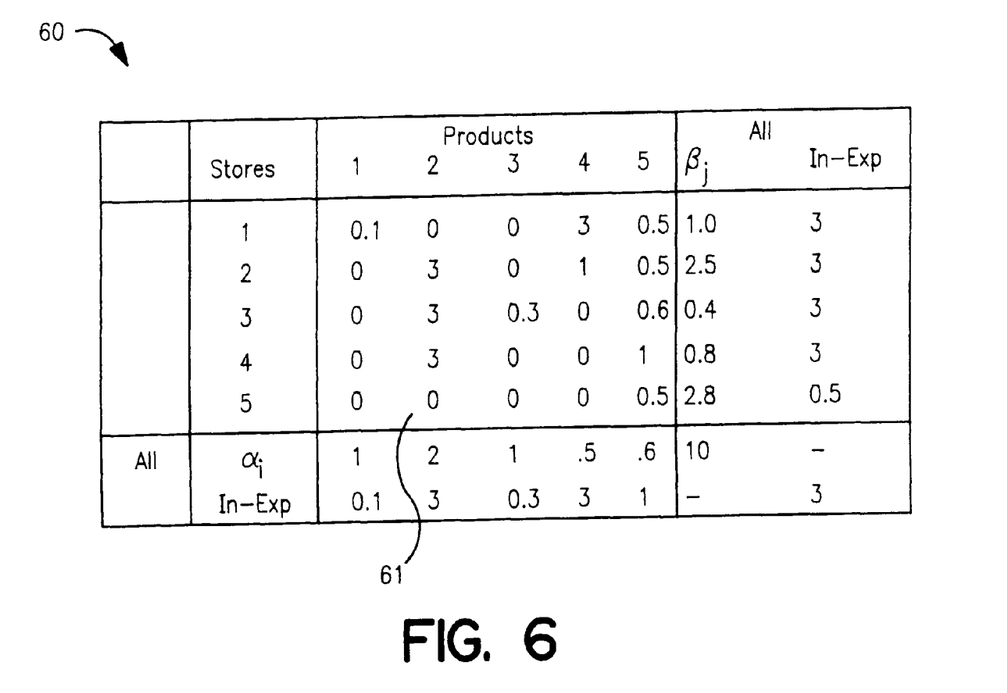
FIG. 6 shows a Product-Store plane of an exemplary data cube illustrating definitions for Self-Exp, In-Exp and Path-Exp according to the present invention.

FIG. 6 shows a Product-Store plane 60 of an exemplary data cube that illustrates the definitions of Self-Exp, In-Exp and Path-Exp. Scaled absolute residuals are shown in an inner cell area 61 of the data cube. The cells in the Product-Store plane have no In-Exp values, while for the Product plane or the Store plane, the In-Exp is the maximum residual over all cells in the corresponding column or row. For the ALL group-by, the In-Exp is the maximum over the In-Exp and Self-Exp of the product group-by and store group-by. For the ALL group-by, the Path-Exp is also of interest since there are two drill-down paths from it. The Path-Exp for the product path is ranked higher than the store path because fewer cells have a high In-Exp value in the product plane, although the "max" exceptions for both paths is the same.

The approach of the present invention may appear at first glance to be unrealizable in practice because of the apparent cost of computing exceptions. Nevertheless, the present invention uses fast computation techniques that make the approach of the present invention feasible for large OLAP data sets. According to the invention, there are three logical phases in the computation of exceptions in an entire cube. The first phase involves computing aggregate values, as specified by a user-provided aggregate function, over which exceptions are found at each group-by of the cube. The second phase involves determining coefficients of the model-fit equations and then using the coefficients for finding the residuals as described in connection with Equations (1) - (8). The third phase involves summarizing exceptions found during the second phase. The computation must be planned carefully because, in most cases, the quantity of data will be too large to fit into main memory. Consequently, intermediate results often are read from and written to a disk, thus requiring carefully planned optimizations. A three dimensional data cube having dimensions A, B and C is used in the following discussion of the fast computation techniques.

During the first phase, aggregate values are computed for each group-by over which exceptions will be found. For OLAP-type data, there is interest in finding exceptions not only at the lowest level of detail, but also at higher levels of aggregation. Preferably, the function(s) used for aggregations is (are) specified by a user. For example, a user may specify "sum of sales" as the aggregate function. In this case, exceptions in "total sales" are reported at various levels of the cube. As another example of an aggregate function, a user might be interested in a more complicated scenario like finding exceptions in "percentage change in total revenue from the same month last year". The problem of efficiently computing aggregates has been addressed by S. Agarwal et al., "On the computation of multidimensional aggregates," In Proc. Of the 22nd Int'l Conference on Very Large Databases, pages 506–521, Mumbai (Bombay), India, September 1996, and is incorporated by reference herein. The present invention uses a sort-based approach that is similar to that disclosed by S. Agarwal et al. for accomplishing the tasks in phase 1.

During the second phase, model Eq. (2) is fit for computing the residuals at each group-by of the cube. In general, separate equations are fitted at different levels of the cube. When the aggregate function is a "mean" function and the mean-based additive model of Eq. (2) is being fitted, a single equation can recursively fit all the group-bys of the cube because the coefficients are calculated using the "mean" function. Consequently, the residuals of a higher level aggregate are the coefficients for all the lower aggregates. For instance, for the three attribute cube ABC, if AB is aggregated using the "mean" function and fit to a mean-based additive model at AB, then the residuals at AB correspond to the $(\alpha\beta)_{ij}$ coefficients in Eq. (2) of a model fit at the ABC level.

A straightforward method of computing residuals at each group-by of a cube is first presented for illustrating the present invention. Improvements are presented subsequently.

The coefficients at each group-by G of a data cube are equal to the average y value at that level minus the sum of the coefficients of all group-bys that are at a lower level of detail than group-by G. Thus, a straight forward and an efficient way for computing the coefficients is using a two pass approach. First, the average y value is computed at each group-by starting from the most detailed group-by. Then, starting from the least detailed level (ALL), for each group-by subtract the coefficients of the group-by that are less detailed than the group-by for which the coefficients are being computed.

For example, consider the three attribute cube ABC. The average y value is computed for each of the $2^3-1=7$ group-bys of the cube by starting from the ABC level and computing the average at AB, AC and BC from ABC, computing the average at A from one of AB or AC, and so on. The coefficients are computed starting from ALL. The coefficient of each member or element of group-by A is the average value at the member minus the coefficient of its parent ALL. The coefficient at AB is the average at AB minus the coefficients at A, B and ALL, and so on. Finally, the coefficients at AB, AC, BC, A, B, C, and ALL are subtracted from the average value at ABC for obtaining the residuals.

The second phase of computation has two parts. The first part of the second phase is computationally similar to the computation of the user-specified aggregate functions performed in phase 1. The second part is computationally intensive because, in general, to compute the coefficients of a k attribute group-by the coefficients must be subtracted from $2^{k-1}$ other group-bys. This is equivalent to joining the k-attribute group-by with $2^{k-1}-1$ other group-bys. When the size of the group-bys is large, computing many multi-attribute joins for each group-by can involve large sorting and comparison costs. Regardless, the first and second phases of computation are easily combined, providing a savings in terms of disk scans and sorting costs.

Model Eq. (2) can be rewritten in a way that remarkably speeds up the computation of phase 2. Instead of Eq. (2), the expected value $\hat{y}_{ijk}$ can be expressed as a sum of three terms:

$$\hat{y}_{ijk}=(ab)_{ij}+(ac)_{ik}+(bc)_{jk}, \quad (9)$$

where $$(ab)_{ij}=\text{Avg}_k(y_{ijk}), \quad (10)$$

$$(ac)_{ik}=\text{Avg}_j(y_{ijk}-(ab)_{ij}), \text{ and} \quad (11)$$

$$(bc)_{jk}=\text{Avg}_i(y_{ijk}-(ab)_{ij}-(ac)_{ik}). \quad (12)$$

The residuals and coefficients from Eq. (2) can be rewritten in terms of the new coefficients as:

$$r_{ijk}=y_{ijk}-(ab)_{ij}-(ac)_{ik}-(bc)_{jk}, \quad (13)$$

$$a_i = \text{Avg}_j((ab)_{ij}), \quad (14)$$

$$b_j = \text{Avg}_i((ab)_{ij} - a_i), \quad (15)$$

$$(\alpha\beta)_{ij} = (ab)_{ij} - a_i - b_j, \quad (16)$$

$$c_k = \text{Avg}_i((ac)_{ik}), \quad (17)$$

$$(\alpha\gamma)_{ik} = (ac)_{ik} - c_k, \quad (18)$$

$$(\gamma\beta)_{kj} = (bc)_{jk}, \quad (19)$$

$$\mu = \text{Avg}_i(a_i), \text{ and} \quad (20)$$

$$\alpha_i = a_i - \mu, \beta_j = b_j, \gamma_k = c_k. \quad (21)$$

Computationally, Eqs. (13)–(21) work as follows: The (ab) values are first computed from the $Y_{ijk}$ values. The computed (ab) values are then subtracted from the $Y_{ijk}$ values. The (ac) values are computed from the once-subtracted y values. The computed (ac) values are subtracted from the once-subtracted y-values. The (bc) values are computed from the twice-subtracted y values and then subtracted from the twice-subtracted y-values. The final y-values (thrice-subtracted y-values) directly provide the residuals.

The foregoing rewriting procedure can be generalized to any number of dimensions. For example, consider a k-dimensional cube. Any y-value of the cube can be expressed as the sum of k coefficients. The final residual is obtained by averaging along each of the k dimensions, in turn, and subtracting the average from all values along that dimension of the cube. The k average values yield the k coefficients of the equation. Mathematically, the $(i_1, \ldots i_k)$th y value can be expressed as the sum of k terms as:

$$Y_{i1\ldots ik} = G^1 + \ldots G^k \quad (22)$$

where $$G^r = \text{Avg}_{i_r}(y_{i1\ldots ik} - G^1 - \ldots - G^{r-1}) \quad (23)$$

and $G^r$ denotes the $(i_1 \ldots i_{r-1} i_{r+1} \ldots i_k)$th term in the group-by obtained by averaging along the rth dimension.

Hierarchies can easily be incorporated into Eq. (22). That is, Eq. (22) would still contain k terms for a dimensional cube. The only difference is that instead of averaging along all the values along a dimension, the elements that belong to the next level of the hierarchy are averaged together along that dimension.

The advantage of rewriting Eq. (2) is two fold: first, the residuals of a k dimensional cube can be computed by joining the residual with k other group-bys instead of $2^{k-1}$ group-bys as in Eq. (2). For instance, the residuals at ABC are computed by joining with coefficients from only three different group-bys AB, AC and BC, instead of joining with seven other group-bys, as would be indicated by Eq. (2). Secondly, the residuals are computed at the same time as the aggregate values of phase 1 are computed, thus saving on the sorting and comparison costs. When ABC is sorted in the order ACB for computing AC, the AC values can be directly subtracted from ACB, and ABC does not require resorting. Next, ACB can be sorted in the order BCA, the coefficients for BC computed from BCA, and then the coefficients subtracted from BCA.

Figure 7:
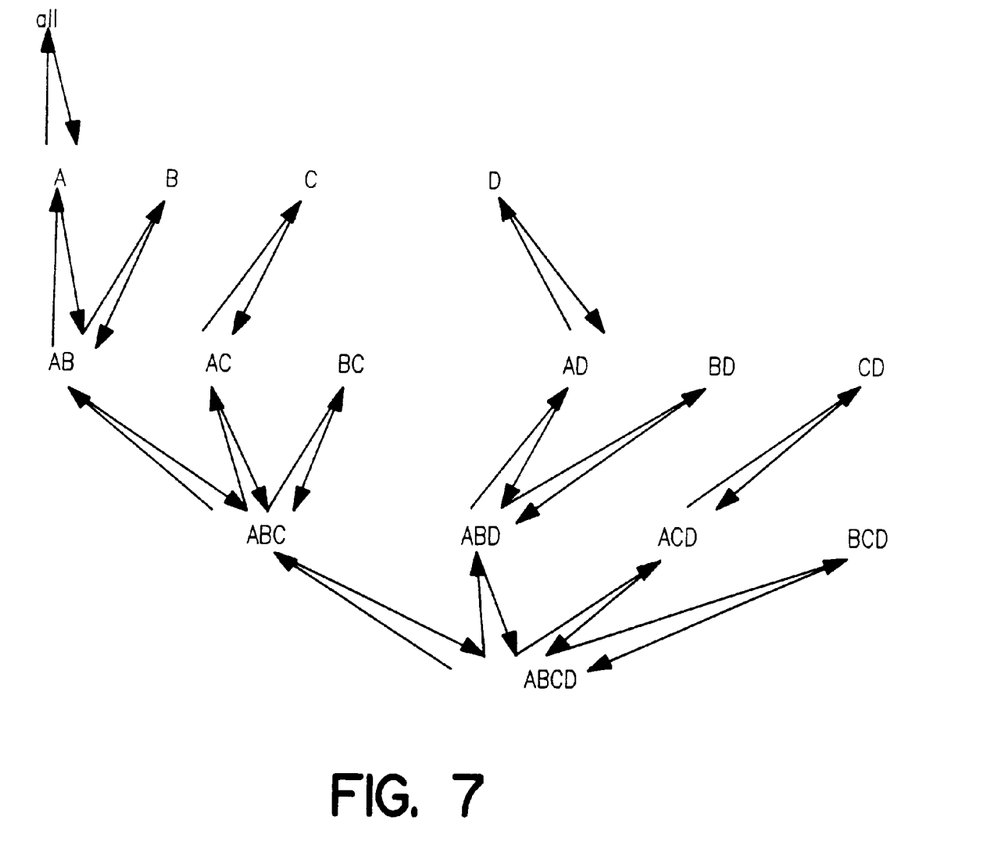
FIG. 7 shows a sequence of coefficient and residual computations for an example of a four attribute group-by according to the present invention.

This method of computation can be generalized for data cubes having higher dimensions. FIG. 7 shows an example of a sequence of computations for obtaining coefficients and residuals for a four attribute group-by according to the present invention. An upwardly-pointing arrow denotes an averaging phase and a downwardly-pointing arrow denotes a subtraction phase. In terms of sorting costs, sorts beyond what are required for simple aggregate computation at all levels of the group-by are not incurred. Consequently, the second phase of the computation can be combined with the first phase of the computation.

During the third phase, summaries of exceptions for each group-by of the cube are computed. Computationally, this phase is similar to phase 1 in which aggregate values for each group-by are computed, but with one difference. Each group-by in the third phase aggregates all of its immediate parents for calculating the Path-Exp values, whereas during phase 1, any one of the parent group-by can be used for computing the aggregate functions. Therefore, all phase 1 optimizations that are based on choosing a good parent for each group-by are inapplicable for the third phase. However, for optimizations based on pipelining, such as disclosed by S. Agrawal et al., supra, the computation of multiple group-bys and using partially sorted parents are applicable.

Each cell of the data cube is associated with Self-Exp, In-Exp and Path-Exp values that are treated just like other precomputed aggregates (e.g., average sales) and, consequently, are stored and indexed in the same framework as aggregate values. Depending upon the particular data cube, it may be useful to update the In-Expand, Path-Exp values at higher level group-bys based on exceptions previously observed in some lower drill-down paths. Further, for high-dimensional data cubes, it may be useful to annotate cells with explanations regarding why the cell was (or was not) flagged as an exception. Additionally, the space required for storing the different exception values can be reduced significantly using three optimizations.

The exact floating point value of an exception is not particularly useful. Often, only a rough estimate of the level of exception is of interest. Therefore, for the first optimization, instead of storing an exception value as a 32-bit floating point number, the exception can be discretized to a small set of eight or sixteen different levels requiring three or four bit per value. Second, only a few of the cells, by definition, have associated non-zero exception values. Storage and retrieval cost are reduced by keeping only the cells with non-zero exceptions. Lastly, the In-Exp value is not stored, but is computed on the fly.

The improvement in time needed for the rewrite-based approach of the present invention to find exceptions when applied to three real-life datasets is now described. The time to find exceptions is also compared with the time for precomputing aggregates in a OLAP data cube. The following examples were performed on an RS/6000 250 workstation running AIX 3.2.5. The workstation had a total physical memory of 256 MB. A buffer of size 32 MB was used. The datasets were stored as flat files on a local 2GB SCSI 3.5" drive.

Three datasets were used that were derived from sales transactions of several department stores and mail order companies. Each dataset differs in the number of transactions, the number of attributes, and the number of distinct values for each attribute. In each case, a "sum" function was used for aggregating the cube.

In the first dataset, the data relates to supermarket purchases and includes a total of 5 million transactions. Each transaction has three attributes: store, data and product category. The second dataset uses data from a mail order company. A sales transaction for this data set consists of three attributes: a Customer Identifier, an Order Date (month and year) and a Product. Additionally, the Product dimension has a hierarchy that groups products based on their category. The and a hierarchy on the date dimension that groups the monthly dates to "years". There are a total of one million transactions. The third dataset includes data having a total of one million transactions relating to grocery purchases of customers from a supermarket. Each transaction has four attributes: the Date of Purchase, the Shopper Type, the Store Code and the Product Group of the item purchased.

Figure 8A:
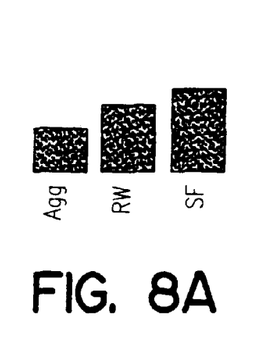
FIGS. 8A–8C show performance of a rewrite-based approach (RW) and a straight-forward approach (SF) for calculating coefficients and residuals according to the present invention with respect to performance for compute all the group-bys (Agg) for several types of exemplary OLAP sessions.
Figure 8B:
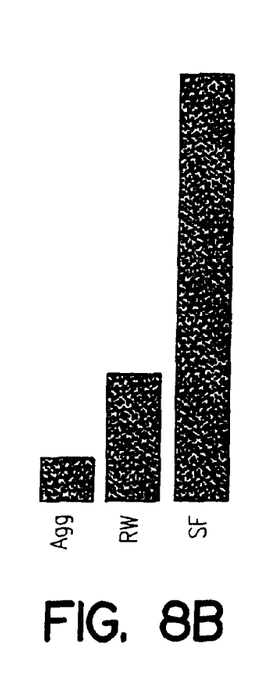
Figure 8C:
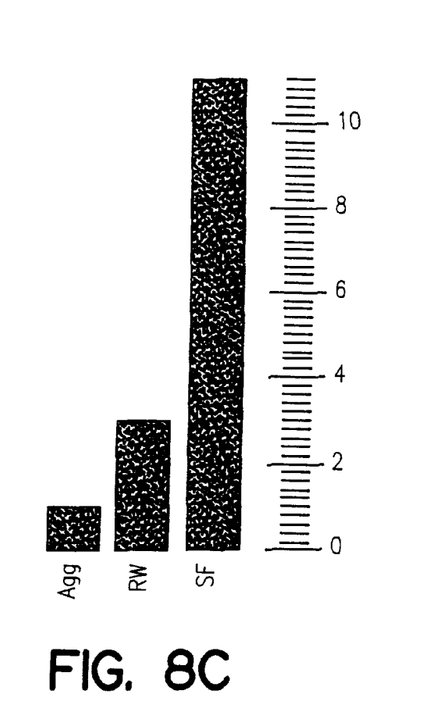

FIGS. 8A–8C show performance of the rewrite-based approach (RW) and the straight-forward approach (SF) for calculating coefficients and residuals according to the present invention with respect to the performance for computing all of the group-bys (Agg) for the first through third datasets, respectively. A relative performance scale is shown at the right side of FIG. 8C and is applicable for each of FIGS. 8A–8C. The total execution time is normalized by the time taken to compute all of the group-bys Agg. From FIGS. 8A–8C, the performance of computing exceptions improves almost three-fold by using the rewrite-based approach of the present invention. The improvement is greater for datasets B (FIG. 8B) and C (FIG. 8C) than for dataset A (FIG. 8A) because the presence of hierarchies and/or a greater number of dimensions (as for dataset-B and C) causes the number of group-bys with which each group-by is joined with (during phase 2) to increase exponentially when compared to the straight-forward approach of the present invention. In contrast, with the rewrite-based approach, the number of group-bys that a particular group-by is joined with increases only linearly.

After the rewriting, the time needed for finding exceptions and summarizing the exceptions comes to within a factor of three of the time needed for computing group-bys. Thus, computationally speaking, pre-mining for exceptions in OLAP data is not too expensive compared to simply pre-computing aggregates.

Figure 9:
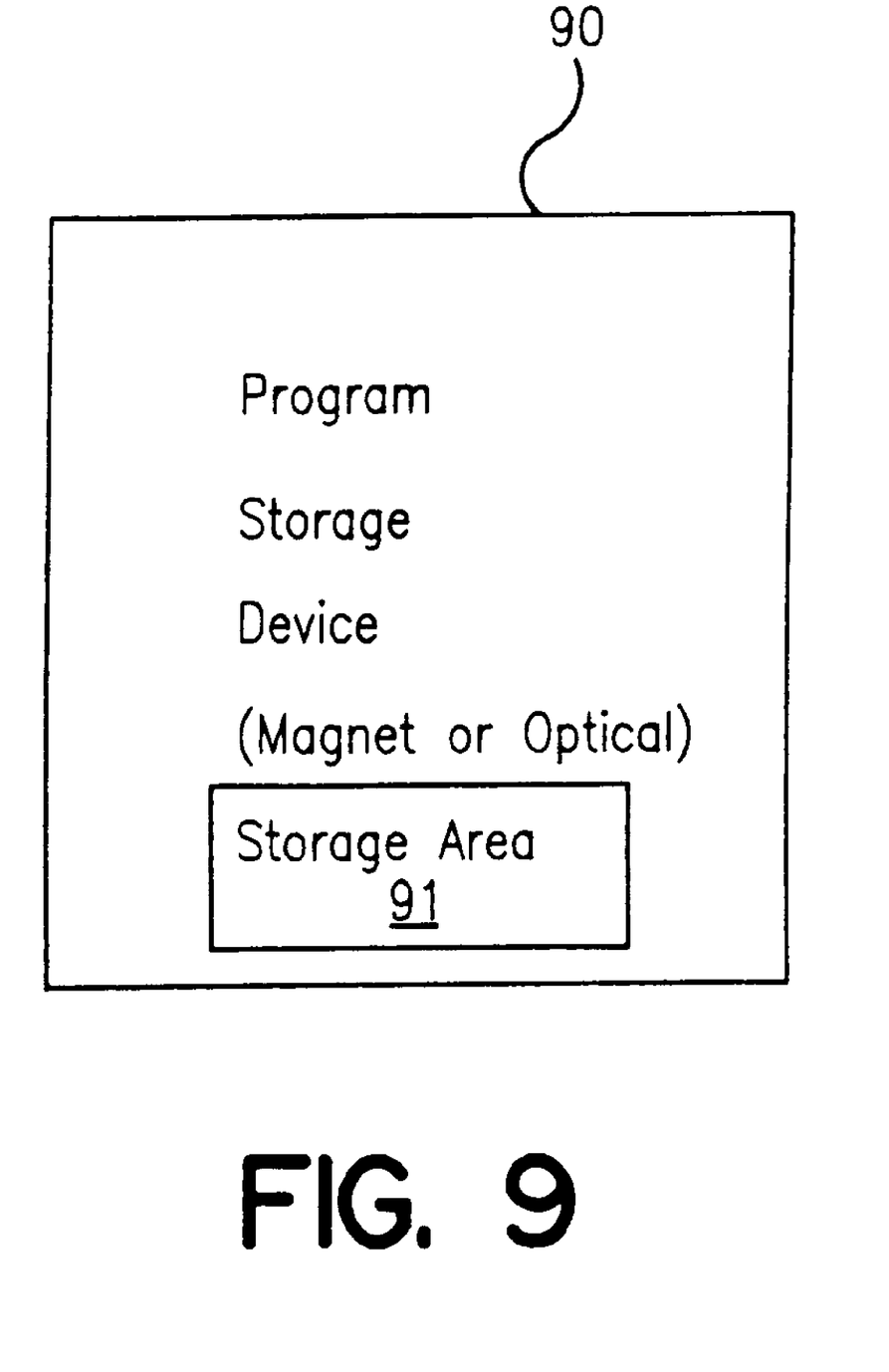
FIG. 9 shows a program storage device having a storage area for storing a machine readable program of instructions that are executable by the machine for performing the method of the present invention for interactively exploring OLAP data cubes.

FIG. 9 shows a program storage device 90 having a storage area 91. Information stored in the storage area in a well-known manner that is readable by a machine, and that tangibly embodies a program of instructions executable by the machine for performing the method of the present invention described herein for interactively exploring OLAP data cubes. Program storage device 90 can be a magnetically recordable medium device, such as a magnetic diskette or hard drive, or an optically recordable medium device, such as an optical disk.

While the present invention has been described in connection with the illustrated embodiments, it will be appreciated and understood that modifications may be made without departing from the true spirit and scope of the invention.

What is claimed is:

1. A method for locating data anomalies in a k-dimensional data cube, the method comprising the steps of:
    associating a surprise value with each cell of a data cube, the surprise value associated with a cell representing a degree of anomaly of a content of the cell with respect to other cells of the data cube; and
    indicating a data anomaly when the surprise value associated with a cell exceeds a predetermined exception threshold.

2. The method according to claim 1, wherein the surprise value associated with each cell is a composite value that is based on at least one of a Self-Exp value for the cell, an In-Exp value for the cell and a Path-Exp value for the cell.

3. The method according to claim 1, wherein the step of associating the surprise value with each cell includes the steps of:
    determining a Self-Exp value for the cell;
    determining an In-Exp value for the cell;
    determining a Path-Exp value for the cell; and
    generating the surprise value for the cell based on the Self-Exp value, the In-Exp value and the Path-value.

4. The method according to claim 3, wherein the Self-Exp value for the cell represents a degree of anomaly of the cell with respect to other cells at a same level of aggregation in the data cube.

5. The method according to claim 3, wherein the In-Exp value for the cell represents a degree of anomaly underneath the cell in the data cube.

6. The method according to claim 5, wherein the In-Exp value for the cell is a maximum surprise value associated with all cells in the data cube underneath the cell.

7. The method according to claim 5, wherein the In-Exp value for the cell is a sum of surprise values associated with all cells in the data cube underneath the cell.

8. The method according to claim 3, wherein the Path-Exp value for the cell represents a degree of surprise for each respective drill-down path in the data cube from the cell.

9. The method according to claim 8, wherein the Path-Exp value for the cell is based on a drill-down path having a fewest number of high value In-Exp cells in the data cube underneath the cell.

10. The method according to claim 3, wherein the step of indicating the data anomaly includes the step of displaying the cell having a background intensity corresponding to the surprise value of the cell.

11. The method according to claim 10, wherein the background intensity corresponds to the Self-Exp for the cell.

12. The method according to claim 3, wherein the step of indicating the data anomaly includes the step of displaying the cell having a border intensity corresponding to the surprise value of the cell.

13. The method according to claim 12, wherein the border intensity corresponds to the In-Exp for the cell.

14. The method according to claim 1, wherein the surprise value of the cell is a residual difference between an expected value for the cell and an actual value for the cell.

15. The method according to claim 14, further comprising the step of summing coefficients corresponding to each of 2k–1 levels of aggregation of the data cube for obtaining the expected value of the cell.

16. The method according to claim 15, further comprising the step of multiplying coefficients corresponding to each of 2k–1 levels of group-bys of the data cube for obtaining the expected value of the cell.

17. The method according to claim 15, further comprising the step of determining a coefficient for each group-by by recursively subtracting all coefficients from group-bys that are at a smaller level of detail than a level of detail of the group-by from an average value at the group-by.

18. The method according to claim 15, further comprising the step of determining a coefficient for each group-by by recursively subtracting all coefficients from group-bys that are at a smaller level of detail than a level of detail of the group-by from an median value at the group-by.

19. The method according to claim 14, wherein the residual difference is determined using the steps of:
    recursively averaging all values of the data cube along each dimension of the data cube; and
    recursively subtracting the average value from each value along each dimension of the data cube.

20. The method according to claim 1, further comprising the steps of:
    determining aggregate values for each group-by of the data cube based on a selected aggregation function;

determining residuals for the cell at each group-by of the data cube; and summarizing exceptional values of the data cube based on the determined residuals.

21. The method according to claim 20, wherein the step of determining residuals at each group-by includes the steps of:

determining an average value for each cell at each level of aggregation; and recursively subtracting from each average value residuals that are at a lower level of detail than the cell.

22. A program storage device comprising:

a storage area; and information stored in the storage area, the information being readable by a machine, and tangibly embodying a program of instructions executable by the machine for performing method steps comprising:

associating a surprise value with each cell of a data cube, the surprise value associated with a cell representing a degree of anomaly of a content of the cell with respect to other cells of the data cube; and indicating a data anomaly when the surprise value associated with a cell exceeds a predetermined exception threshold.

23. The program storage device according to claim 22, wherein the surprise value associated with each cell is a composite value that is based on at least one of a Self-Exp value for the cell, an In-Exp value for the cell and a Path-Exp value for the cell.

24. The program storage device according to claim 22, wherein method includes the step of associating the surprise value with each cell includes the steps of:

determining a Self-Exp value for the cell;

determining an In-Exp value for the cell;

determining a Path-Exp value for the cell; and generating the surprise value for the cell based on the Self-Exp value, the In-Exp value and the Path-value.

25. The program storage device according to claim 24, wherein the Self-Exp value for the cell represents a degree of anomaly of the cell with respect to other cells at a same level of aggregation in the data cube.

26. The program storage device according to claim 24, wherein the In-Exp value for the cell represents a degree of anomaly underneath the cell in the data cube.

27. The program storage device according to claim 26, wherein the In-Exp value for the cell is a maximum surprise value associated with all cells in the data cube underneath the cell.

28. The program storage device according to claim 26, wherein the In-Exp value for the cell is a sum of surprise values associated with all cells in the data cube underneath the cell.

29. The program storage device according to claim 24, wherein the Path-Exp value for the cell represents a degree of surprise for each respective drill-down path in the data cube from the cell.

30. The program storage device according to claim 29, wherein the Path-Exp value for the cell is based on a drill-down path having a fewest number of high value In-Exp cells in the data cube underneath the cell.

31. The program storage device according to claim 24, wherein method includes the step of indicating the data anomaly includes the step of displaying the cell having a background intensity corresponding to the surprise value of the cell.

32. The program storage device according to claim 31, wherein the background intensity corresponds to the Self-Exp for the cell.

33. The program storage device according to claim 24, wherein the step of indicating the data anomaly includes the step of displaying the cell having a border intensity corresponding to the surprise value of the cell.

34. The program storage device according to claim 33, wherein the border intensity corresponds to the In-Exp for the cell.

35. The program storage device according to claim 22, wherein the surprise value of the cell is a residual difference between an expected value for the cell and an actual value for the cell.

36. The program storage device according to claim 35, wherein the method further comprises the step of summing coefficients corresponding to each of 2k–1 levels of aggregation of the data cube for obtaining the expected value of the cell.

37. The program storage device according to claim 36, wherein the method further comprises the step of determining a coefficient for each group-by by recursively subtracting all coefficients from group-bys that are at a smaller level of detail than a level of detail of the group-by from an average value at the group-by.

38. The program storage device according to claim 36, wherein the method further comprises the step of determining a coefficient for each group-by by recursively subtracting all coefficients from group-bys that are at a smaller level of detail than a level of detail of the group-by from an median value at the group-by.

39. The program storage device according to claim 35, wherein the method further comprises the step of multiplying coefficients corresponding to each of 2k–1 levels of group-bys of the data cube for obtaining the expected value of the cell.

40. The program storage device according to claim 35, wherein the residual difference is determined using the method steps of:

recursively averaging all values of the data cube along each dimension of the data cube; and recursively subtracting the average value from each value along each dimension of the data cube.

41. The program storage device according to claim 22, wherein the method further comprises the steps of:

determining aggregate values for each group-by of the data cube based on a selected aggregation function;

determining residuals for the cell at each group-by of the data cube; and summarizing exceptional values of the data cube based on the determined residuals.

42. The program storage device according to claim 41, wherein the step of determining residuals at each group-by includes the steps of:

determining an average value for each cell at each level of aggregation; and recursively subtracting from each average value residuals that are at a lower level of detail than the cell.

43. The program storage device according to claim 22, wherein the program storage device includes a magnetically recordable medium.

44. The program storage device according to claim 22, wherein the program storage device includes an optically recordable medium.

* * * * *